Patented Apr. 14, 1953

2,635,119

UNITED STATES PATENT OFFICE 2,635,119

PROCESS FOR CONVERTING OLEFINIC HYDROCARBONS TO KETONES

Harry de V. Finch, Berkeley, and Kenneth E. Furman, Richmond, Calif., assignors to Shell Development Company, Emeryville, Calif., a corporation of Delaware No Drawing. Application June 28, 1951, Serial No. 234,157

8 Claims. (Cl. 260—597)

This invention relates to a process whereby olefinic hydrocarbons are reacted with water in the presence of a catalyst to produce ketones having the same number of carbon atoms as the olefinic reactant.

The processes hitherto employed in forming ketones from olefins in this manner possess a number of drawbacks. For one thing, their productivity has been low since it has not been possible to obtain a good conversion of olefin to ketone, per pass through the reactor, except as the feed stream is passed through the catalyst at abnormally low rates. Again, the prior art processes have not been adapted for either liquid or gaseous phase operation, they having, in general, been limited to vapor phase operations. Since many of the higher olefins and olefinic hydrocarbons which desirably are converted to ketones are liquid under the conditions employed in effecting the conversion, it would be desirable if an efficient method were available which would permit of either vapor, liquid, or mixed vapor and liquid phase operations, and so would be well adapted for use with all types of olefinic hydrocarbon reactants.

It is our discovery that olefinic hydrocarbons can be reacted with water to produce good yields of the corresponding ketones when the reaction is conducted at elevated temperatures and pressures in the presence of at least one sulfide of molybdenum, tungsten, tellurium or selenium. In the preferred practice of the invention, there is also employed a quantity, not to exceed about 40 mole percent, based on the total amount of catalyst employed, of a sulfide of iron, cobalt or nickel, and a particularly desirable catalyst combination has been found to be a mixture of tungsten sulfide and nickel sulfide. Use of any of these catalysts or catalyst combinations has been found to give high conversions of the olefinic reactants as well as high yields of the desired ketones even when the reactants are passed through the catalyst at relatively rapid rates, this being particularly true when the reaction is conducted in the vapor phase.

The term "conversion" is employed herein to designate the percentage of the olefinic reactant which is converted to ketones and other reaction products, while the term "yield" refers to the percent of the converted olefinic portion which goes to ketones.

The olefinic hydrocarbons to be employed as reactants are those which contain an aliphatic chain of at least three carbon atoms, between two of which there exists an aliphatic double bond. They can be selected from a wide variety of compounds, including those of a normally gaseous nature as well as those which are liquids either at room temperatures or under the elevated pressure conditions which prevail during the reaction. Representative reactants, any one or more of which can be converted to a ketone in accordance with the method of the present invention, include propylene, isopropylene, 1-butene, 2-butene, 1-pentene, 2-pentene, 2-methyl-2-butene, 1-hexene, 2-hexene, 3-hexene, 3-methyl-1-pentene, 3-methyl-2-pentene, 1-heptene, 2-heptene, 1-octene, 2-octene, 3-ethyl-2-hexene, 1-nonene, 2-nonene, 1-decene, 2,7-dimethyl-2-octene, 2-methyl-5-ethyl-5-heptene, 1-dodecene, 1-hexadecene, allyl benzene, propenyl benzene, 3-phenyl-1-hexene, 4-o-tolyl-1-butene, and 1,6-diphenyl-3-hexene. The olefins which contain at least 5 carbon atoms in the molecule, as 1- and 2-pentene, 1-heptene, 1- and 2-octene, and the like, constitute a preferred reactant class for employment in the present invention.

The above-mentioned and other olefinic compounds can be treated individually, or when mixed with one another or with aliphatically saturated organic compounds. Thus, it is possible to employ olefin-containing mixtures which contain even less than 50% of the olefinic reactant(s) as is the case with by-product streams obtained from various petroleum refining operations. The latter streams, which normally contain a preponderant amount of paraffin hydrocarbons, can be employed as recovered in the refinery, and the presence of the large proportion of non-olefinic diluent gases in no wise decreases the efficiency of the present process as regards conversion and yield, though the output of a given unit is naturally impaired when feed streams low in olefinic reactant are employed.

The catalysts used in the process of the present invention are solids which can be prepared by any of the methods known in the art. Further, they can be employed in any suitable form, as granules, pellets, powders or the like, and they can either be used as such, or be supported on or admixed with an inert material, as pumice, infusorial earth, Death Valley clay, kieselguhr, alumina or a silicate.

In forming the ketone, the olefinic reactant combines with the water in equimolar proportions, with the resulting product then yielding up hydrogen to form the ketone. However, while equimolar reactant proportions can be used with success, the preferred practice is to employ an excess of water. Particularly good results have been obtained by employing from about 2 to 10 moles of water for each mole of olefinic compound.

As noted above, the reaction between the olefinic compound and water goes forward in the presence of the sulfide catalyst at elevated temperatures and pressures. As regards the temperature, a suitable range is from about 200 to 500° C., though a preferred range is from about 250 to 400° C. Pressures of from about 150 to 2000 p. s. i. have been employed with good results, though somewhat lower or even higher pressures can be used upon occasion.

The reaction can be effected either batchwise, intermittently or continuously. Thus, in batch operations the reactants, in either gaseous or liquid form, may be placed, together with the catalyst, in a suitable pressure vessel and allowed to remain there under the desired reaction conditions for a suitable reaction interval, the latter normally varying from ½ to 15 or more hours, depending on the degree of reaction completeness sought. The longer intervals favor a more extensive conversion of the olefinic materials present in the feed. In continuous methods of operation, the reactants, in the desired physical state, are passed through a body of the catalyst supported within a reactor vessel. When operating in this fashion it is preferred to maintain the reactants in the vaporous state since higher throughput rates can then be employed, while still obtaining good olefin conversion and ketone yields. Thus, the activity of the sulfide catalysts described above is such as to permit of obtaining good results even when employing space velocities in excess of 800, the term "space velocity" being employed herein to designate the grams of hydrocarbon in the feed stream which are contacted with a liter of catalyst, per hour. In general, when operating in the vapor phase it is preferable to practice the process of this invention at space velocities of at least 200.

The ketones produced by the present process can be recovered from the reacted mixture in any desired manner, as by distillation, or by extraction with water, followed by distillation. In vapor phase operations, the unreacted gases, or at least the olefinic portion thereof, are preferably recycled back through the reactor along with new quantities of the feed gases in order to obtain maximum olefin conversion.

The sulfide catalysts employed in the present process are characterized by an unusually long, active life. However, when it appears that the activity of the catalyst has fallen off to any appreciable extent, the catalyst may be restored to its original level of activity by burning with an oxygen-containing gas, and preferably by passing a stream of sulfur dioxide (admixed with an inert diluent gas) through the catalyst bed for a short time. This regeneration can be effected in situ at the reaction temperatures employed in the reaction, thus eliminating temperature adjustments in the bed.

In the following examples, which illustrate the process of the invention in various of its embodiments, the tungsten sulfide-nickel sulfide catalyst employed, which contained about 2 moles nickel and 4 moles sulfur per mole of tungsten, was prepared by dissolving tungstic acid in aqueous ammonia to form a solution of ammonium tungstate. Hydrogen sulfide was then passed into the solution to convert the tungstate to the corresponding thiotungstate. A second solution containing the required amount of soluble nickel salt was then added to the thiotungstate solution, thereby precipitating the nickel sulfide. The tungsten was then precipitated (largely as tungsten trisulfide) by adding an acid, e. g., 25% sulfuric acid, until the pH of the solution was reduced to a value between about 1 and 2. The precipitated sulfide mixture was then separated from the solution and dried in an atmosphere of hydrogen sulfide. In the liquid phase experiments, the catalyst was charged as a powder, while in the vapor phase runs, the catalyst was pelleted and then pre-treated with hydrogen at 300° C.

The molybdenum sulfide catalyst employed was made up of molybdenum trisulfide. It was catalyst No. Mo–407, a product of The Harshaw Chemical Company, obtained and used in tablet form.

EXAMPLE I

In this operation, a vaporous mixture of olefin and water was passed through a heated, steel reaction tube containing the above-described tungsten sulfide-nickel sulfide catalyst. The hydrocarbon and water were pumped separately to a pre-heating unit which vaporized the reactants, with the vaporous mixture then being fed under pressure through the reaction chamber wherein the reaction temperature was maintained at the desired level by an electrical heating unit. The effluent from the tube was condensed in a water-cooled condenser-receiver to provide a liquid from which the water layer was separated. The oil layer was fractionated, yielding a hydrocarbon fraction, a ketone fraction and a higher boiling fraction. Table I given below shows the results obtained by using various olefinic reactants and different reaction conditions.

TABLE I

*Vapor phase conversion of olefin to ketone over tungsten sulfide-nickel sulfide catalyst at a pressure of 500 p. s. i. and temperature of 305° C.*

| Run No. | Olefin | Mole Ratio, $H_2O$/Olefin | Space Velocity (g. hydrocarbon/hr./l of Cat.) | Olefin Conversion | Ketone Yield |
|---|---|---|---|---|---|
| 1 | 1-octene | 4.9 | 823 | 34 | 42 |
| 2 | 1-pentene | 5.3 | 400 | 42 | 40 |
| 3 | 2-pentene | 3.6 | 565 | 38 | 32 |
| 4 | mixed $C_6$ olefins.[1] | 5.7 | 520 | 34 | 14 |
| 5 | mixed $C_7$ olefins.[2] | 4.8 | 590 | 16 | 40 |

[1] Obtained by dimerization of propylene.
[2] Obtained by cracking of paraffin wax.

EXAMPLE II

In this operation, 1-octene was reacted with water in the liquid phase over a variety of catalysts, as shown in Table II below. These operations were carried out in a 300 ml. stainless steel hydrogenation-type bomb fitted to a rocking type of heater. The reactants were heated with agitation for the desired period of time, and under the elevated pressure condition (about 1600 p. s. i.) developed on heating the enclosed contents of the bomb to 300° C. After cooling, the products were removed and the (powdered)

catalyst filtered off. The ketonic portion of the resultant liquid was recovered by the method described in Example I above.

TABLE II

Liquid phase conversion of 1-octene to ketone at pressure of 1600 p. s. i. and temperature of 300° C.

| Run No. | Catalyst | Charge | | | Time, hrs. | Olefin Conversion, Percent | Ketone Yield, Percent |
|---|---|---|---|---|---|---|---|
| | | 1-octene moles | water moles | Catalyst, g. | | | |
| 1 | W/Ni/S | 0.4 | 7.0 | 50 | 12 | 85 | 38 |
| 2 | W/Ni/S | 0.4 | 5.5 | 10 | 12 | 51 | 33 |
| 3 | W/Ni/S | 0.4 | 5.5 | 10 | 4 | 33 | 26 |
| 4 | W/Ni/S | 0.41 | 5.5 | 10 | 1 | 27 | 13 |
| 5 | W/Ni/S | 0.41 | 5.5 | 1 | 12 | 20 | 27 |
| 6 | MoS$_3$ | 0.39 | 5.5 | 10 | 12 | 60 | 21 |

The invention claimed is:

1. The process for converting an olefinic hydrocarbon containing an aliphatic chain of at least 3 carbon atoms, between two of which there exists aliphatic double bond, to a ketone having the same number of carbon atoms as the hydrocarbon, which comprises treating said hydrocarbon with water at a temperature between about 200 and 500° C. at a pressure of from about 150 to 2000 p. s. i. in the presence of a catalyst comprising at least one compound selected from the group consisting of the sulfides of molybdenum, tungsten, tellurium and selenium, together with a total of from about 0 to 40 mole percent, in terms of the total catalyst composition, of at least one other catalyst selected from the group consisting of the sulfides of nickel, iron and cobalt.

2. The process of claim 1 wherein the catalyst comprises a mixture of tungsten sulfide and nickel sulfide.

3. The process of claim 1 wherein the catalyst comprises molybdenum trisulfide.

4. The process for converting an olefinic hydrocarbon containing an aliphatic chain of at least 3 carbon atoms, between two of which there exists an aliphatic double bond, to a ketone having the same number of carbon atoms as the hydrocarbon by treatment with water, which comprises passing a vaporous mixture containing from about 2 to 10 moles of water per mole of said hydrocarbon, at a temperature between about 200 and 500° C. and at a pressure of from about 150 to 2000 p. s. i., through a catalyst comprising at least one compound selected from the group consisting of the sulfides of molybdenum, tungsten, tellurium and selenium, together with a total of from about 0 to 40 mole percent, in terms of the total catalyst composition, of at least one other catalyst selected from the group consisting of the sulfides of nickel, iron and cobalt.

5. The process of claim 4 wherein the hydrocarbon reactant comprises an olefin containing at least 5 carbon atoms.

6. The process of claim 4 wherein the hydrocarbon reactant comprises an olefin containing at least 5 carbon atoms, and the catalyst comprises a mixture of tungsten sulfide and nickel sulfide.

7. The process for converting an olefin containing at least 5 carbon atoms to a ketone having the same number of carbon atoms as the olefin, which comprises treating said olefin with water at a temperature between about 250 and 400° C. and at a pressure between 150 and 2000 p. s. i. in the presence of a catalyst comprising a mixture of tungsten sulfide and nickel sulfide.

8. The process of claim 7 wherein the olefin is 1-octene.

HARRY DE V. FINCH.
KENNETH E. FURMAN.

References Cited in the file of this patent

UNITED STATES PATENTS

| Number | Name | Date |
|---|---|---|
| 1,999,620 | Van Peski | Apr. 30, 1935 |
| 2,162,913 | Eversole et al. | June 20, 1939 |
| 2,414,951 | Jasaitis et al. | Jan. 28, 1947 |
| 2,523,686 | Engel | Sept. 26, 1950 |